US011604489B2

(12) United States Patent
Panas et al.

(10) Patent No.: US 11,604,489 B2
(45) Date of Patent: Mar. 14, 2023

(54) SYSTEM AND METHOD FOR MICROMECHANICAL LOGICAL AND GATE

(71) Applicant: Lawrence Livermore National Security, LLC, Livermore, CA (US)

(72) Inventors: Robert Matthew Panas, Dublin, CA (US); Frederick Sun, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 46 days.

(21) Appl. No.: 17/331,107

(22) Filed: May 26, 2021

(65) Prior Publication Data
US 2022/0382316 A1 Dec. 1, 2022

(51) Int. Cl.
*G05G 11/00* (2006.01)
*F16H 21/02* (2006.01)
*F16H 21/44* (2006.01)

(52) U.S. Cl.
CPC ............. *G05G 11/00* (2013.01); *F16H 21/02* (2013.01); *F16H 21/44* (2013.01)

(58) Field of Classification Search
CPC .......... G05G 11/00; F16H 21/02; F16H 21/44
See application file for complete search history.

(56) References Cited

U.S. PATENT DOCUMENTS 2,881,634 A * 4/1959 Keehn .................... F16H 35/16
74/516
10,855,259 B1 12/2020 Panas et al.
(Continued)

FOREIGN PATENT DOCUMENTS

WO WO-2017074925 A1 5/2017

OTHER PUBLICATIONS

International Search Report and Written Opinion in corresponding International Application No. PCT/US2022/020953 dated Aug. 9, 2022, 7 pages.

(Continued)

*Primary Examiner* — Terence Boes
(74) *Attorney, Agent, or Firm* — Harness, Dickey & Pierce, P.L.C.

(57) ABSTRACT

The present disclosure relates to a mechanical AND-gate logic system that may make use of a first and second lever arms, a first pivot linkage coupling the lever arms, an output member, and a second pivot linkage coupling the second lever arm to the output member. The first lever arm has first and second spaced apart ends for independently receiving separate logic level 1 or logic level 0 input signals thereon, and an output end spaced apart from the first and second input ends. The output end is disposed generally equidistant from the first and second spaced apart ends. The second lever arm has an input end and an output end and can move in both pivoting and translating movements. The first pivot linkage couples the output end of the first lever arm to the input end of the second lever arm such that both the input end and the output end of the second lever arm are able to either pivot and or to translate. The second lever arm is only able to translate and apply a logic 1 level input signal to the output member, to thus generate a logic 1 level output signal, when a logic level 1 input signal is applied simultaneously to both of the first and second input ends of the first lever arm.

17 Claims, 7 Drawing Sheets

(56) References Cited

U.S. PATENT DOCUMENTS

| | | | |
|---|---|---|---|
| 2008/0144304 A1* | 6/2008 | Culpepper | B81B 3/0062 |
| | | | 977/724 |
| 2016/0195893 A1* | 7/2016 | Hilt | H01L 41/08 |
| | | | 60/529 |
| 2017/0192748 A1 | 7/2017 | Merkle et al. | |
| 2018/0248552 A1* | 8/2018 | Pascall | H03K 19/20 |
| 2020/0142440 A1* | 5/2020 | Pascall | H03K 19/20 |
| 2022/0154766 A1* | 5/2022 | Pan | F16C 11/12 |

OTHER PUBLICATIONS

A. G. Bromley, "Charles Babbage's Analytical Engine, 1838," in Annals of the History of Computing, vol. 4, No. 3, pp. 196-217, Jul.-Sep. 1982, doi: 10.1109/MAHC.1982.10028.

Merkle, R. C. et al. "Mechanical Computing Systems Using Only Links and Rotary Joints," Preprint at http://arxiv.org/abs/1801,03534v2 [cs.ET] Mar. 25, 2019, 34 pp.

Ion, A., Wall, L., Kovacs, R. & Baudisch, P. "Digital mechanical metamaterials," in Proceedings of the 2017 CHI Conference on Human Factors in Computing Systems 977-988 (ACM Press, New York, 2017).

Raney, J. R. et al. "Stable propagation of mechanical signals in soft media using stored elastic energy," Proc. Natl Acad. Sci. USA 113, 9722-9727 (2016).

Zanaty, M., Schneegans, H., Vardi, I., and Henein, S. (Feb. 6, 2020). "Reconfigurable Logic Gates Based on Programable Multistable Mechanisms," ASME. J. Mechanisms Robotics. Apr. 2020; 12(2): 021111. https://doi.org/10.1115/1.4045970.

Agrawal, Mayank et al. "Muscle-inspired flexible mechanical logic architecture for colloidal robotics," arXiv preprint arXiv:2012.09345 (2020).

Panas et al. "Combining Cross-Pivot Flexures to Generate Improved Kinematically Equivalent Flexure Systems," Precision Engineering, 72, May 10, 2021, pp. 237-249.

* cited by examiner

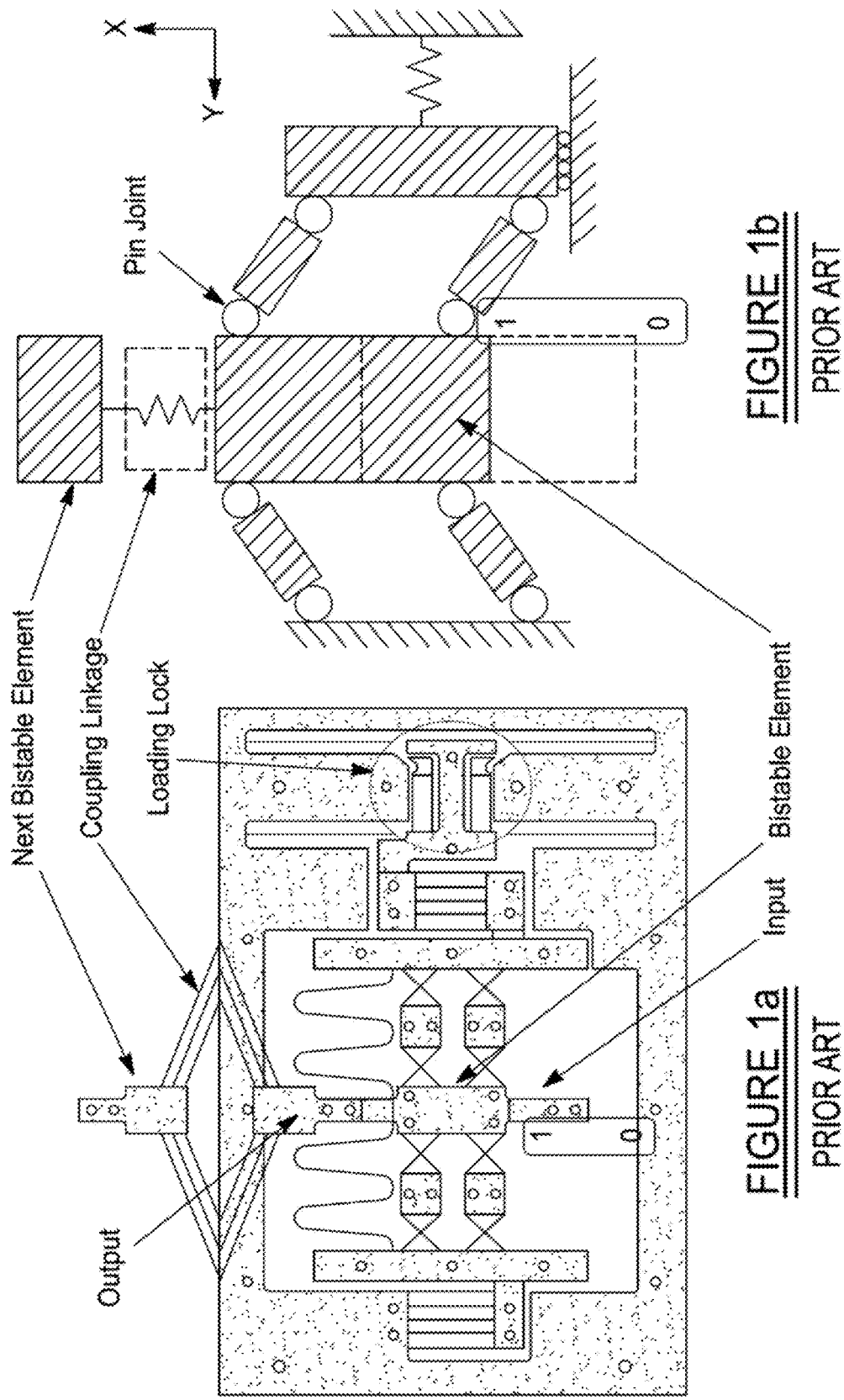

1 State

0 State

State = (Input 1, Input 2, Output)

US 11,604,489 B2

SYSTEM AND METHOD FOR MICROMECHANICAL LOGICAL AND GATE

STATEMENT OF GOVERNMENT RIGHTS

This invention was made with Government support under Contract No. DE-AC52-07NA27344 awarded by the United States Department of Energy. The Government has certain rights in the invention.

FIELD

The present disclosure relates to structures for carrying out logic operations, and more particularly to a mechanical logic gate structure that can carry out logical AND operations for use in displacement-based mechanical logic systems.

BACKGROUND

The statements in this section merely provide background information related to the present disclosure and may not constitute prior art.

The earliest computers were mechanical in nature, most famously the difference engine and analytical engine by Babbage as early as in the 1830s (see A. G. Bromley, "Charles Babbage's Analytical Engine, 1838," Annals of the History of Computing, vol. 4, no. 3, pp. 196-217, July-September 1982, doi: 10.1109/MAHC.1982.10028). That engine depended purely on mechanical parts, using rotational mechanical components, to perform logic operation. More recently, Merkle et al (see Merkle, R. C. et al. "Mechanical Computing Systems Using Only Links and Rotary Joints", Preprint at http://arxiv.org/abs/1801.03534v2 (2018)) proposed a Turing mechanical computing system based on rigid links and rotary joints. The system operates with an external clock and represents the logic states with the displacement of rigid links. Rigid links are ideal from an analytical perspective but are impractical due to material limitations and the increasing scale of loading required to drive the systems as they get more complex, since all elements must be moved simultaneously.

Practical systems will need compliant pulse chains where the energy is stored in a traveling pulse of finite width, rather than a rigid link representing a pulse of infinite width, and therefore infinite stored energy). Ion et al. (see Ion, A., Wall, L., Kovacs, R. & Baudisch, P., "Digital mechanical metamaterials" in Proceedings of the 2017 CHI Conference on Human Factors in Computing Systems 977-988 (ACM Press, New York, 2017)) integrated a mechanical logic system with 3D-printed metamaterial mechanisms. The digital signals between adjacent cells propagate as mechanical impulses between adjacent cells through bi-stable springs embedded within the material. The bi-stable springs may amplify the incoming signal with their stored elastic potential energy analogous to the domino effect, and similar to the domino effect requires a manual reset after the mechanical pulse passed through owing to the lack of bipolar operation.

Raney et al. (see Raney, J. R. et al., "Stable propagation of mechanical signals in soft media using stored elastic energy", Proc. Natl Acad. Sci. USA 113, 9722-9727 (2016)) demonstrated logic operations such as the AND gate, the OR gate, and diode logic and propagate the mechanical signals over arbitrary distances. However, the bistability demonstrated by Raney et al. is not degenerate, so it will only function asymmetrically for the two different signal polarities.

Zanaty et al. (see Zanaty, M., Schneegans, H., Vardi, I., and Henein, S. (Feb. 6, 2020), "Reconfigurable Logic Gates Based on Programable Multistable Mechanisms", ASME. J. Mechanisms Robotics. April 2020; 12(2): 021111. https://doi.org/10.1115/1.4045970) constructed a reconfigurable mechanical logic gate capable of carrying out NOR and NAND operations with a multi-stable compliant mechanism. Unfortunately the structure is not symmetric with regards to its inputs, so is likely to not operate through all potential signal polarities. Functional mechanical computation ultimately requires a degenerate logical operator architecture (so both states are at equivalent energy levels or very nearly so) that can unidirectionally propagate bipolar signals down a compliant chain and carry out functionally complete logical operations for all permutations of input states. While these designs contain some of the desired performance metrics, none have been able to implement a range of capabilities required for a fully general operation.

Accordingly, while the above-described advances in microscale mechanical logic have offered alternatives to electronics based logic systems, and which can operate in harsh environments, thus carrying out local computation to extract complex signals without electrical power draw, limitations and drawbacks still remain with existing mechanical logic based systems which limit their use in various applications. Further work with mechanical logic systems is expected to provide a foundation for extending the use of such systems to ultra-miniaturized microscale, nanoscale, or even atomic scale logic systems, where computational power may potentially be built into materials, or unpowered structures could perform logic operations and respond to specific combinations of environmental signals. Ultra-miniaturized mechanical logic may potentially help enable intelligence without necessitating the typically larger power structures, as microscale elements could be triggered by equivalently microscale transduction energy. This is expected to lead to advances in fields including i) data storage in extreme environments, ii) authentication tagging of high value items, and iii) inexpensive disposable health monitor tabs keyed to a specific multi-domain combination of environmental bio/chemical/temperature/vibrational signals.

SUMMARY

This section provides a general summary of the disclosure, and is not a comprehensive disclosure of its full scope or all of its features.

In one aspect the present disclosure relates to a mechanical AND-gate logic system. The system may comprise a first lever arm having first and second spaced apart input ends for independently receiving separate logic level 1 or logic level 0 input signals thereon. The first lever arm may further include a output end spaced apart from the first and second input ends. The output end may further be disposed generally equidistant from the first and second spaced apart ends. A second lever arm may be included which has an input end and an output end, and is able to move in both a pivotal movement and a translating movement. A first pivot linkage may be included to couple the output end of the first lever flexure to the input end of the second lever arm such that both the input end and the output end of the second lever arm are able to pivot and to translate. An output member translatable may be included which is movable between first and second positions. The output end of the second lever arm is coupled to the output member via a second pivot linkage. The second lever arm is only able to substantially translate and apply a logic 1 level input signal to the output member when a logic level 1 input signal is applied simultaneously to both of the first and second input ends of the first lever arm, and wherein translating movement of the second lever arm causes the output member to translate from the first position to the second position, representing changing from a logic 0 level state to a logic 1 level state. In another aspect the present disclosure relates to a mechanical AND-gate logic system. The system may comprise a first lever arm having first and second spaced apart input ends for independently receiving separate logic level 1 or logic level 0 input signals thereon. The first lever arm may further include an output end spaced apart from the first and second input ends, the output end further being disposed generally equidistant from the first and second spaced apart ends. A second lever arm may be included which forms a linear member having an input end and an output end, and is able to move in both a pivotal movement and a translating movement. A first pivot linkage may be included to couple the output end of the first lever arm to the input end of the second lever arm such that both the input end and the output end of the second lever arm are able to pivot and to translate. A compressive stiffness member may be included which has an input end and an output end, and is translatable between first and second positions, and is configured to apply a biasing force sufficient to prevent movement from the first position to the second position except when logic 1 level signals are being applied simultaneously to both of the first and second input ends of the first lever arm. The output end of the second lever arm is coupled to the input end of the compressive stiffness member by a second pivot linkage. The second lever arm is only able to translate and apply a logic 1 level input signal to the input end of the compressive stiffness member when a logic level 1 input signal is applied simultaneously to both of the first and second input ends of the first lever arm, and wherein translating movement of the second lever arm causes the compressive stiffness member to translate from the first position to the second position, representing changing from a logic 0 level state to a logic 1 level state. The biasing force generated by the compressive stiffness member is sufficient to cause translating and pivoting motion of both of the first and second lever arms when a logic 1 level input signal is removed from either of the first and second input ends of the first lever arm, to thus enable the compressive stiffness member to translate from a logic 1 level state back to a logic 0 level state.

In still another aspect the present disclosure relates to a method for forming a mechanical AND-gate logic system. The method may comprise providing a first lever arm having first and second spaced apart input ends for independently receiving separate logic level 1 or logic level 0 input signals thereon. The method may further include configuring the first lever arm such that an output end thereof is spaced apart from the first and second input ends, the output end further being disposed generally equidistant from the first and second spaced apart ends. The method may further include using a first pivot linkage to couple the output end of the first lever arm to an input end of a second lever arm, and such that the second lever arm is able to move with both a pivotal movement at each of its input and output ends, and also a translating movement. The method may further include coupling an output member translatable between first and second positions to the output end of the second lever arm via a second pivot linkage. The second lever arm may only be able to translate and apply a logic 1 level input signal to the output member when a logic level 1 input signal is applied simultaneously to both of the first and second input ends of the first lever arm, and wherein translating movement of the second lever arm causes the output member to translate from the first position to the second position, representing changing from a logic 0 level state to a logic 1 level state.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 1a is an illustration of a prior art mechanical logic circuit with coupling linkage for coupling the circuit to another mechanical logic circuit;

FIG. 1b is a simplified schematic illustration of the logic circuit of FIG. 1a;

DETAILED DESCRIPTION

Example embodiments will now be described more fully with reference to the accompanying drawings.

The present disclosure demonstrates for the first time a displacement based logical AND operator that can meet the needed criteria for a practical, fully functioning system.

The present disclosure relates to mechanical structures and methods therefore that can carry out the logical AND operations for displacement-based mechanical logic systems. The various embodiments disclosed herein are scale-independent and can be combined with bistable micromechanical logic elements to carry out mechanical logical operations. This AND gate design can be miniaturized, potentially down to the molecular scale, allowing computational power to be built into materials. Unpowered printed structures provide an alternate route to many new capabilities including quantum bit coherence or performing logical operations by tapping into ambient energy and responding to specific keyed multi-dimensional environmental inputs. The multi-domain sensors may distribute intelligence down to the level of the sensor by enabling it to identify, discern, and intelligently differentiate signals, all without cumbersome power circuitry. Embedded mechanical logic is expected to aid in i) data storage in extreme environments, ii) authentication tagging of high value items, and iii) inexpensive disposable health or biochemical monitoring tabs.

Figure 1C:
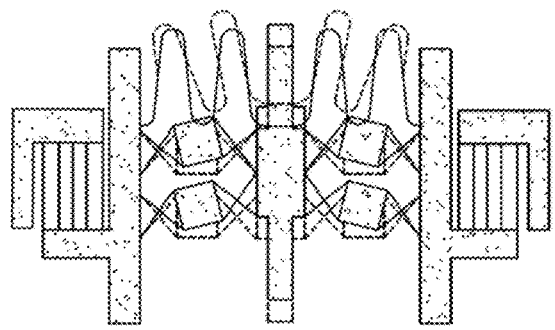
FIG. 1c shows the prior art circuit of FIG. 1b in both its logic "1" and "0" level states.
Figure 1C:
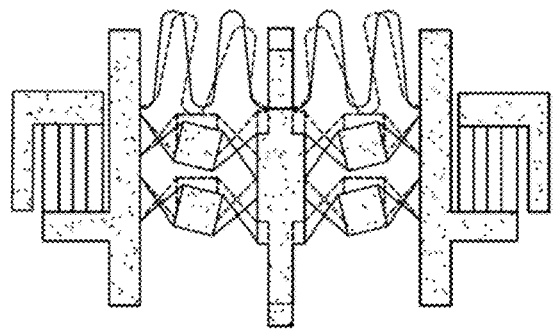

A bistable element with coupling linkage is shown in FIGS. 1a and 1b, which is covered under U.S. Pat. No. 10,855,259, which illustrates the design of the structure needed to propagate signals. The disclosure of U.S. Pat. No. 10,855,259 is hereby incorporated by reference into the present disclosure. Displacement-based mechanical logic requires repeating elements to transmit data pulses (FIGS. 1a-1c) and a nonlinear element to carry out the Boolean operations (FIGS. 1d-2d). The instantiation of the basic repeating element (FIG. 1a) contains a bistable element and coupling linkage. The large displacement motion is enabled by cross-pivot flexure bearings. The idealized design (FIG. 1b) shows how the design maps to the generalized model. The bistable states are shown in FIG. 1c.

Figure 1D:
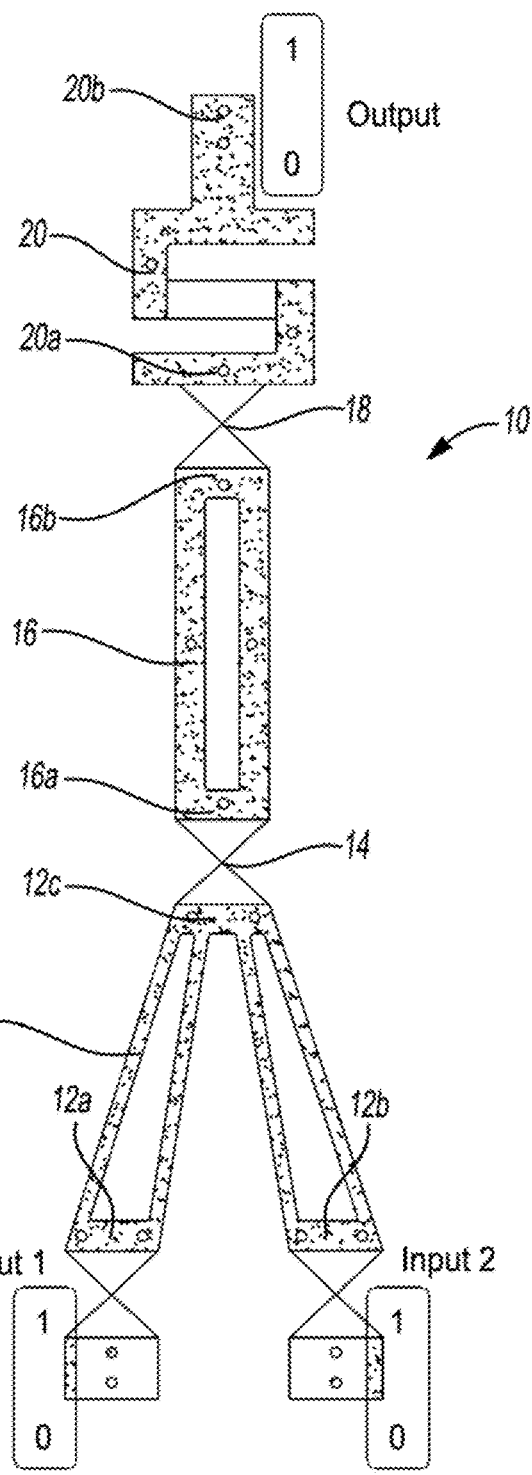
FIG. 1d shows a side view of one embodiment of an AND-gate system in accordance with the present disclosure.
Figures 1E, 1F:
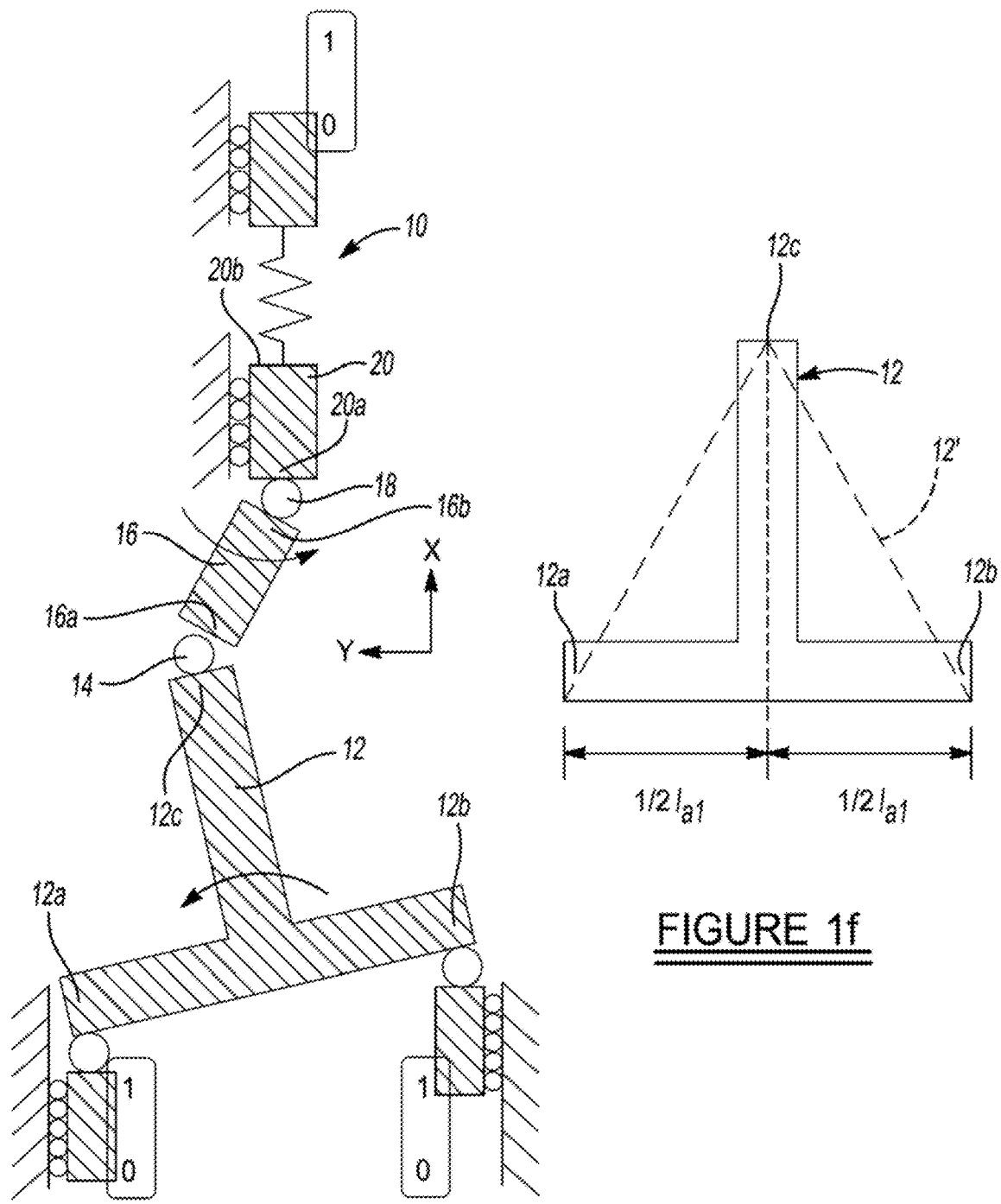
FIG. 1e is a schematic illustration of the AND-gate system of FIG. 1d.
FIG. 1f is a high level diagram of the first lever arm illustrating how each of its two input ends are equidistant from the output end.

An AND-gate system 10, tuned to operate on the above-described bistable elements, is shown in FIGS. 1d and 1e, with its orientations shown in FIGS. 1f-2d along with a truth table for each orientation/condition. The AND-gate system 10 in this example makes use of first and second lever arms 12 and 16, respectively, coupled by a pivot linkage 14, and a compressive stiffness member 20 coupled via a pivot linkage 18 with the second lever arm 16. A first input end 12a of lever arm 12 forms a first input and a second input end 12b of the lever arm forms a second input. An output end 12c of the lever arm 12 is spaced apart from the input ends 12a and 12b and at an approximate midpoint between the input ends 12a and 12b. Second lever arm 16 includes an input end (or input side) 16a and an output end (or output side) 16b, while the compressive stiffness member 20 similarly includes an input end (or input side) 20a and an output end (or output side) 20b.

The compressive stiffness member 20 may be a flexible element, for example and without limitation, structures including a coil spring, a Belleville spring, or any other flexible structure, with a carefully designed degree of compressibility and/or spring rate, which is constructed (i.e., constrained) to provide a desired degree of linear movement when both of the first and second input ends 12a and 12b are receiving logic 1 level input signals. The pivot linkages 14 and 18 may be pivot flexures, such as, without limitation, those described by Panas et al., *Combining Cross-Pivot Flexures to Generate Improved Kinematically Equivalent Flexure Systems*, Precision Engineering, May 10, 2021.

Figure 2A:
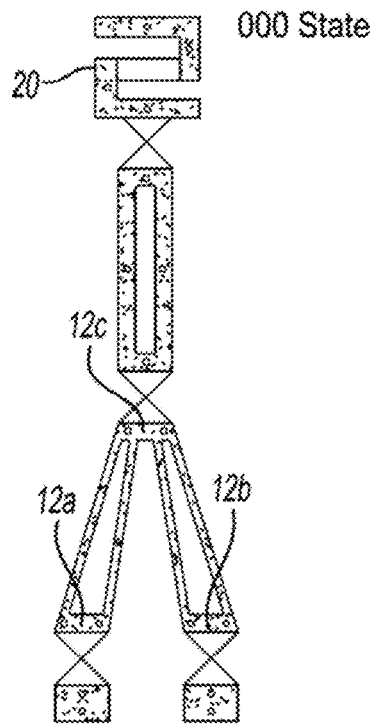
FIGS. 2a-2d illustrate the AND-gate system in its various states along with a truth table for each state.
Figure 2B:
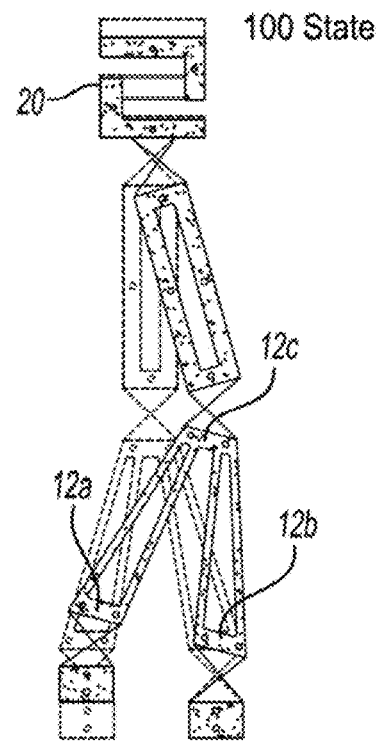
Figure 2C:
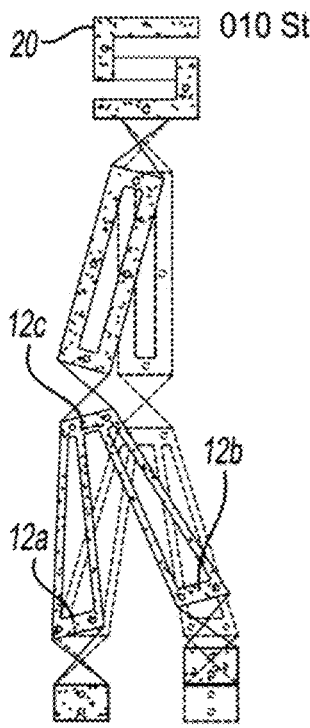
Figure 2D:
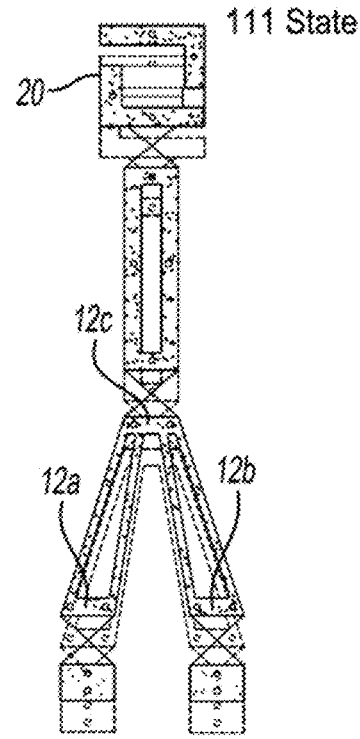

FIGS. 2a-2d illustrate the different orientations of the components of the AND-gate system 10 depending on which inputs 12a and/or 12b are receiving logic 1 level inputs. FIG. 2a shows the orientation of the AND-gate system 10 when both of the inputs 12a are receiving logic 0 level signals (FIG. 1f); FIG. 2b shows the orientation when only input end 12a is receiving a logic 1 level signal; FIG. 2c shows the orientation when only input end 12b is receiving a logic 1 level signal; and FIG. 2d shows the orientation when both of inputs 12a and 12b are receiving logic 1 level input signals, which produces a logic 1 level output signal at the output end 20b of the compressive stiffness member 20.

The AND-gate system 10 design provides degenerate (equivalent energy) and symmetric bi-stability, a critical feature for reversible logic. This means the AND-gate system 10 will operate equivalently with signals of either polarity and will correctly transition to represent the AND operator under all conditions. The present AND-gate system 10 design in this example makes use of discrete compliant elements linking rigid bodies to ensure fine control over all compliances for the purposes of development. Prior AND-gate designs have explored similar lever arm designs for different types of inputs (e.g., as described by M. Agrawal et al. "Muscle-inspired flexible mechanical logic architecture for colloidal robotics," arXiv preprint arXiv: 2021.09345 (2020)). Future designs may be simplified by shifting to distributed compliance structures to reach the confirmed design parameters.

The device symmetry of the AND-gate system 10 ensures equal responsiveness to either input port 12a or 12b. The pivot linkages 14 and 18 shown in FIG. 1(e) absorb X-axis motion at the output through rotational cosine length attenuation when the input ends 12a and 12b are not driven synchronously. Rotation of both of the lever arms 12 and 16 is suppressed and displacement is transferred to the compressive stiffness member 20 (i.e., the output) when both inputs 12a and 12b are synchronous (i.e., both at logic 1 levels). Translation of the lever arms 12 and 16 is suppressed and rotation is maximized when the input ends 12a and 12b are asynchronous (i.e., one receiving a logic 1 level signal while the other receives a logic 0 level signal). The rotational cosine effect creates a non-linearity that can be exploited to produce AND-gate behavior as shown in FIGS. 2a-2d. The rigid lever arms 12 and 16 provide high stiffness to reject unwanted state changes via back-driving. By "back driving" it is meant that the force from downstream logical elements could potentially drive an unwanted and incorrect change in the state of the AND-gate. A compressive compliance is added by the compressive stiffness member 20 at the interface to the output structure (not shown) to which the AND-gate system 10 is coupled to retain the basic structure of bistable element nodes separated by compliant couplings that enables signal propagation.

The AND-gate system 10 design is uniquely well suited for bipolar, resettable requirements and is readily scalable, as well as being compatible with layer-based fabrication approaches such as carried out by additive manufacturing systems. The length of the lever arm 12 of the AND-gate system 10 should be slightly tuned to ensure propagation despite incomplete state transitions at the input ends 12a and 12b. As part of the tuning process, the AND-gate system 10 kinematics are initially designed based on the assumption that the two input ends 12a and 12b of the lever arm 12 reach the full equilibrium location when each receives a logic 1 level input signal. However, in actual use of the AND-gate system 10, these displacements of the input ends 12a and 12b will typically be slightly attenuated by the finite compliance of the AND-gate system 10 and surrounding coupling linkages to which it may be coupled. The length of the central lever arms 12 and 16 of the AND-gate system 10 can be easily adjusted to compensate for this effect to ensure a full and accurate output effect as shown in FIGS. 1d-2d.

Logical Operations

The AND-gate system 10 needs to be able to transmit logic pulses of either polarity. Symmetry of input ports and polarity reduces all possible transitions to two dynamic output scenarios (i.e., transitions) for the AND-gate system 10 to be fully functional: 1) the conjunct transition, and 2) the disjunct transition, as illustrated graphically in FIGS. 3a and 3b. The conjunct transition (FIG. 3a) marks the change of inputs from opposite to equivalent states (e.g., 010→111), while the disjunct transition in FIG. 3b (e.g., 111→010) marks the reverse change. In the present discussion, for example, the first digit in the state (or truth table) "010" would mean a "0" logic level input signal on the input end 12a, the second digit "1" means a level "1" logic level input signal on the input end 12b, and the third digit "0" means a "0" logic level output at the upper end (output end 20b) of the compressive stiffness member 20 (FIGS. 1d and 1e). This convention (i.e., first digit is the first applied input, second digit is the second applied input, and the third digit is the resulting output) will be used throughout the following discussion. The signal propagation continues through the AND-gate system 10 and to the output chain in each of the dynamic output cases. This propagation is what imposes complex restrictions on the AND-gate system 10 elastomechanics.

The AND-gate system 10 contains two energy storage mechanisms, differential and compressive. Differential motion is defined between the two input ends 12a and 12b and is captured by the non-dimensional stiffness "$K_{ad}$", which can be normalized by the maximum differential stiffness possible in the structure as defined in the following AND-gate design section to generate the term $r_{kad}$. The differential motion acts as an energetic source in conjunct transitions but as a sink for the pulse in disjunct transitions, which ultimately limits the efficiency of the AND-gate system 10 since it must meet the requirements for both types of dynamic transitions. Compressive motion, subject to the non-dimensional stiffness $K_{ac}$, plays the role of a coupling linkage between the input and output ports (i.e., input ends 12a and 12b and the output side 20b of the compressive member 20). The compressive stiffness should be impedance matched to the output coupling linkages (labeled $K_{ap3}$ in FIG. 5) to support pulse propagation.

Figures 3A, 3B:
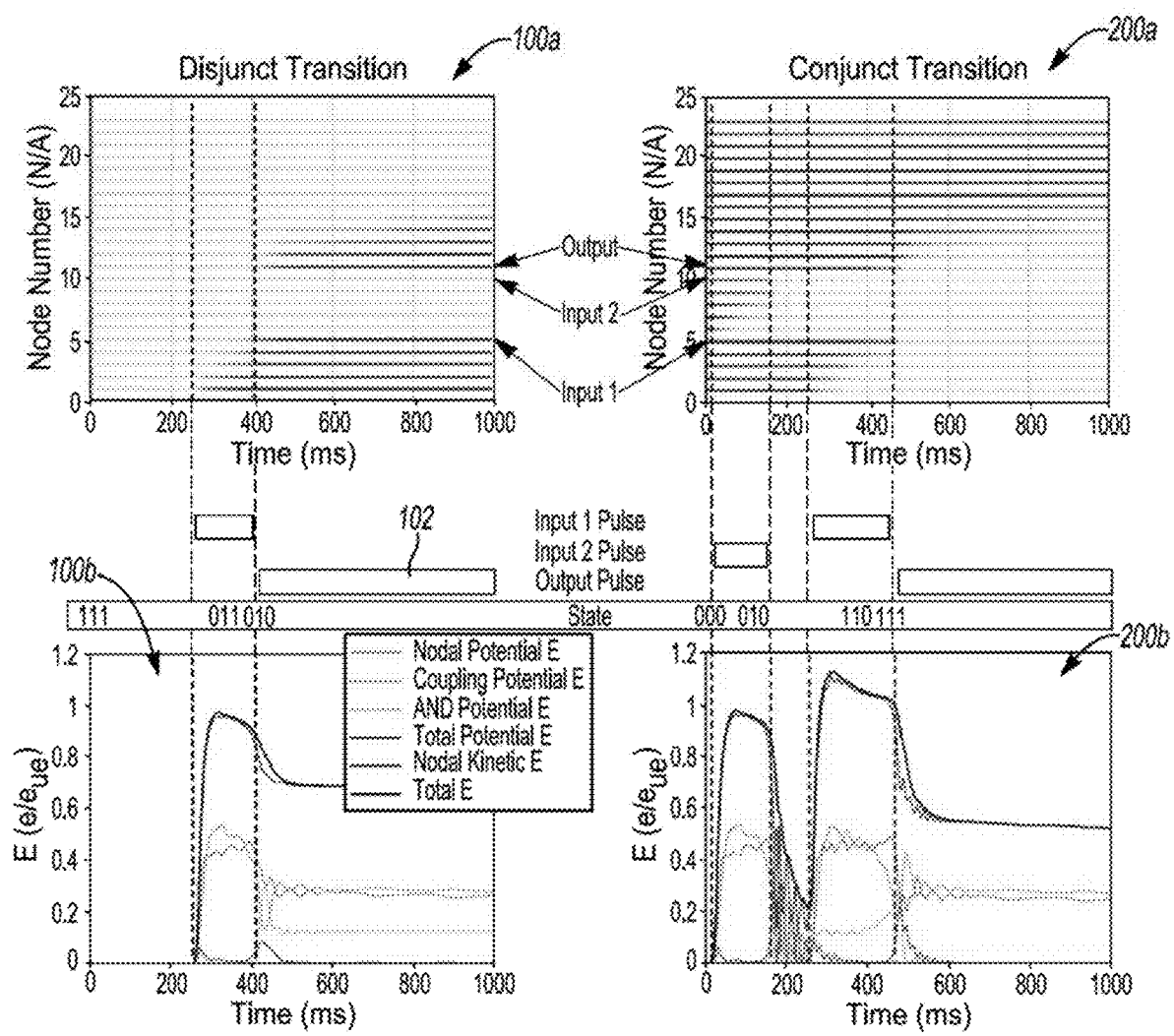
FIG. 3a shows a Euler time step simulation including compliance links and masses, for a disjunct transition, along with an associated nodal location chart.
FIG. 3b shows a Euler time step simulation including compliance links and masses, for a conjunct, transition, along with an associated nodal location chart.

FIG. 3a shows a transition to a disjunct state where the two input ports (input ends 12a and 12b) shift to opposite values and pass the pulse as represented by 111 to 010. FIG. 3b shows the transition to a conjunct state (b) where the two input ports shift to the same value and pass the pulse as represented by 010 to 111. The disjunct case in FIG. 3a starts at 111, then a falling pulse reaches input 1, driving the AND-gate system 10 to 010. The conjunct case in FIG. 3b starts at 000 with a rising pulse sent to input 2 (i.e., input end 12b) to raise the AND-gate system 10 state to 010, after which a second rising pulse reaches input 1, driving the system to 111. The energy interplay through this logic operation is captured in the lower charts of FIGS. 3a and 3b and shows the fraction lost to the AND-gate system 10.

The AND-gate system 10 was studied with a Euler time step simulation which includes the compliance link network, damping and masses. The two dynamic transitions (disjunct and conjunct) are shown in graphs 100a and 200a of FIGS. 3a and 3b, respectively, with the pulse structure and the energy profiles displayed below in their corresponding nodal location charts 100b and 200b. The bistable elements and AND-gate system 10 in this model are designed using the framework described in the following AND-gate design section. The cyclic oscillation of pulse energy between bistable element nodes and coupling linkages is visible in the pulse 102 propagating out of the output port in FIG. 3a. The AND-gate system 10 behavior regimes in the impedance plot 300 in FIG. 3c were identified by iteratively adjusting the critical compressive stiffness parameter until the simulated output behavior changed.

Figure 4:
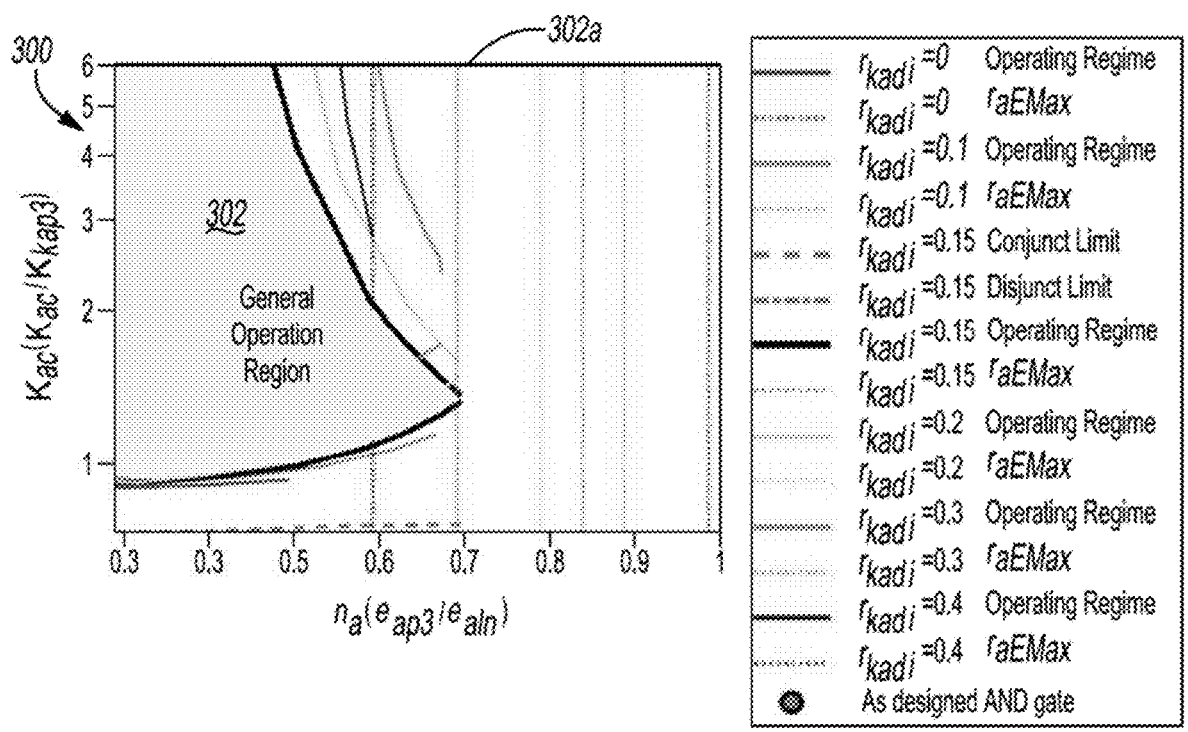
FIG. 4 is an impedance plot illustrating the behavior regimes for the AND-gate system to show how the output changed as a result of iteratively adjusting the compressive stiffness parameter until the simulate output behavior changed.

The AND-gate system 10 conjunct and disjunct transitions place competing compliance requirements on the gate compression stiffness $k_{ac}$ as shown in graph 300 of FIG. 4, with the dashed and dash-dotted lines for the present AND-gate system 10 design represented by curve 302a. The overlap of these two requirements defines the colored and black outlined operating regime 302 where the AND-gate system 10 impedance is tuned to pulse propagation. The energy attenuation through the gate, $\eta_a$, and the gate differential stiffness, $k_{ad}$, alter the operational bounds of the compression stiffness. At high gate energy efficiencies, there is little excess energy to spare on imperfect transmission mechanics, so the operational space shrinks toward an impedance match with the output port chain stiffness $k_{ap3}$. The lower bound of operation is set by the minimum stiffness in disjunct transition needed for the pulse to leave the AND-gate system 10. The upper bound of the operating regime 302 is set by the maximum stiffness in conjunct transition which still allows the pulse center to enter the AND-gate system 10. The gate differential stiffness $k_{ad}$ controls the energy released by the AND-gate system 10 in the conjunct transition, boosting the incoming pulse energy so as to raise the upper bound for the pulse to enter the AND-gate system, but plays little role in the minimum stiffness at the output which lets the pulse leave the AND-gate system 10. The parameter $k_{ad}$ also drains energy from the overall gate theoretical peak efficiency $r_{aEMax}$. The optimal tradeoff occurs at around $r_{kad}$=0.15 with 63% gate efficiency and an impedance match is ensured with $k_{ac}/k_{cp3}$=1.4.

The impedance plot in FIG. 4 thus captures the competing dynamics underlying the matching of the gate impedance (kac) to the surrounding chains. The conjunct and disjunct transitions define limits to the compressive stiffness that depend on the gate energy efficiency $\eta_a$, which captures the ratio of the pulse energy at the output port versus the active input port. Low efficiencies provide significant energy drained from the pulse to help it pass through the gate, while high efficiencies require a much finer understanding of the propagation mechanics.

The AND-gate system 10 can be represented by a 5-dimensional design space (three geometric and two stiffness parameters), where only a small regime supports pulse propagation. This regime is discovered via a process defined in detail in the AND-gate design section below, and summarized here. A kinematic analysis is first used to ensure the rotational nonlinearity produces AND operator performance in ideal conditions. The differential stiffness is next set to absorb about 15% of the pulse energy, with the optimum value discovered by the AND-gate impedance plot 300 in FIG. 4. The gate efficiency $n_a$ is set up to the efficiency limit reachable within the constraints on the pulse propagation region 302 as shown in FIG. 4. Finally, the compressive stiffness is centered within the bounds as defined by the impedance plot.

AND-Gate Design

Figure 5:
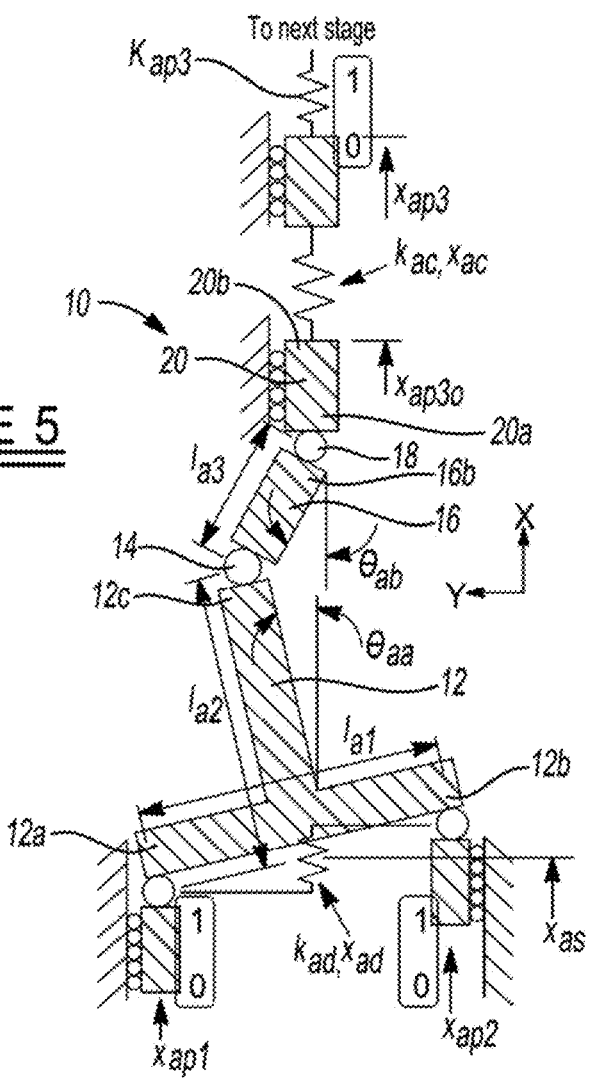
FIG. 5 shows a schematic illustration of the AND-gate system with various design parameters mapped on to the illustration to help explain the design and tuning of the system.

The AND-gate system 10 is shown in FIG. 5 with the relative parameters mapped onto the elements of the system to aid in explaining various design factors that should be considered in designing the system. The AND-gate system 10 is comprised of the components 12, 14, 16, 18 and 20, which are free to rotate and/or translate relative to one another as noted previously in the discussion of FIGS. 1d and 1e. It should be noted that the $l_{a1}$, $l_{a2}$ linkage from the input ports (i.e., input ends 12a and 12b) to the first rotary joint (pivot linkage 14) is structured in one embodiment as an inverted V-shape to allow for the two input ports to expand away from one another in the Y-axis. This ensures the structure does not lock when it rotates, since the rotation forces $l_{a1}$ to increase slightly when the input ports are guided by linear shuttles. FIG. 1f shows a highly simplified diagram illustrating how, in one embodiment, the output end 12c of the first lever arm 12 is spaced apart from the input and output ends 12a and 12b, but located equidistantly from the input ends 12a and 12b (i.e., the ends 12a, 12 and 12c essentially forming the vertices of an isosceles triangle 12' as shown in FIG. 1f).

An even more detailed figure which helps to illustrate and explain the geometry is labeled in FIG. 5. The inputs 12a and 12b and output 20b of the AND-gate 12 are connected to bistable elements which properly constrain the motion of the AND gate input ports. The bistable element connections may be made using separate levels (i.e., not all arranged within a single common plane), however alternate approaches can be taken using right angle linkages to keep all elements on the same plane.

The basic dimensional parameters of the AND-gate system 10 as shown in FIG. 5 are kad, kac, la1, la2 and la3. An additional parameter is required to capture the energy transfer behavior of the AND-gate system 10, that being raE, which describes the ratio of the pulse energy out of the AND-gate system 10, denoted by eaOut, compared to the theoretical maximum energy output, denoted by eaOutMax. The non-dimensionalized terms are shown in Eq. (1). The term Kad is the non-dimensionalized differential motion stiffness and is normalized to the compressive stiffness to simplify the elastomechanic calculations. The term Kac is the non-dimensionalized compressive stiffness associated with the compressive stiffness member 20 and is normalized to the coupling linkage stiffness of the output port, kacp3, as this output port stiffness determines (i.e., scales) the requirements on the compressive stiffness. All displacements in the AND-gate system 10, those being Xa=[xap1, xap2, xap3, xap3o, xad, xac, xas] and linkage lengths La=[la1, la2, la3], are normalized by the equilibrium displacement of the bistable elements, xbe.

$$K_{ad} = \frac{k_{ad}}{k_{ac}},\ K_{ac} = \frac{k_{ac}}{k_{acp3}},\ X_a, L_a = \frac{x_a, l_a}{X_{be}},\ r_{aE} = \frac{e_{aOut}}{e_{aOutMax}} \quad \text{Eq. (1)}$$

The lever arm 12 and 16 lengths, la1, la2, and la3, are set by the requirements to ensure AND-gate nonlinear behavior as well as the design maximum values set for the two linkage angles, θaaMax, θabMax. The stiffness and energy terms Kad, Kac, and raE, are set by the requirements of pulse propagation. The AND-gate non-linear response to the two inputs (p1 and p2) is captured in the output port (p3) (output end 20b) uncompressed displacement, xap3o.

The motion of the inputs $X_{ap1}$ and $X_{ap2}$ can be redefined into differential, $X_{ad}$, and shared, $X_{as}$, terms, as shown in Eq. (2) and Eq. (3).

$$X_{as} = \frac{X_{ap1} + X_{ap1}}{2} \quad \text{Eq. (2)}$$

$$X_{ad} = X_{ap2} - X_{ap1} \quad \text{Eq. (3)}$$

The motion of the output, $X_{ap3}$, can be compared to the uncompressed displacement, $X_{ap3o}$, to determine the compression displacement, $X_{ac}$, as shown in Eq. (4).

$$X_{ac} = X_{ap3} - X_{ap3o} \quad \text{Eq. (4)}$$

The uncompressed displacement can be calculated geometrically as determined by the differential and shared motion, shown in Eq. (5).

$$X_{ap3o} = X_{as} + L_{a2}\left(\sqrt{1 - \left(\frac{X_{ad}}{L_{a1}}\right)^2} - 1\right) + L_{a3}\left(\sqrt{1 - \left(\frac{L_{a2}X_{ad}}{L_{a1}L_{a3}}\right)^2} - 1\right) \quad \text{Eq. (5)}$$

The AND-gate system 10 nonlinear behavior constraint is applied such that the 000 and 010 state are equivalent, in other words, that the output port is at the same location regardless of the state of one of the input ports. This provides one constraint. Three constraints are supplied to set the three AND-gate linkages when the nonlinear behavior constraint is combined with the design maximum values set for the two linkage angles, θaaMax, θabMax. The requirement on the horizontal linkage $L_{a1}$ is simply constrained by the θaa rotation angle as shown in Eq. (6).

$$L_{a1} = 2\sin^{-1}(\theta_{aaMax}) L_{a1} = 2\sin^{-1}(\theta_{aaMax}) \quad \text{Eq. (6)}$$

The requirement on La2 in Eq. (7) and La3 in Eq. (8) capture the complexity of the nonlinear effect.

$$L_{a3} = \frac{\dfrac{1}{L_{a1}^2\left(\sqrt{\frac{1}{4} - L_{a1}^{-2}} - \frac{1}{2}\right) + 1} + L_{a1}^2 - 2} {\tan(\theta_{abMax})[2 + L_{a1}\sin(\theta_{abMax})]} + \tan(\theta_{abmax}) \quad \text{Eq. (7)}$$

$$L_{a2} = \frac{1}{2}\sqrt{\frac{1 - 2^{L_{a3}}}{L_{a1}^2\left(\sqrt{\frac{1}{4} - L_{a1}^{-2}} - \frac{1}{2}\right) +} + L_{a3}^2 + \frac{1}{2} - \frac{L_{a3}}{2}} \quad \text{Eq. (8)}$$

The next step in the design is to define the elastomechanics of the gate based on the two internal stiffnesses. The force of the AND-gate on each port's node, $f_a=[f_{ap1}, f_{ap2}, f_{ap3}]$ is nondimensionalized to $F_a=[F_{ap1}, F_{ap2}, F_{ap3}]$ by the characteristic force of the gate, $k_{ac}*x_{be}$, as shown in Eq. (9).

$$F_a = \frac{f_a}{k_{ac}X_{be}} \quad \text{Eq. (9)}$$

The differential stiffness generates equal and opposite force on the input gates, while the compression stiffness generates a return force which is modified by the kinematics of the gate, captured by the term $a_{aF}$ as shown in Eq. (10).

$$\alpha_{aF} = \frac{L_{a2}X_{ad}}{L_{a1}^2}\left[\left[\left(\frac{L_{a3}}{L_{a2}}\right)^2 - \left(\frac{X_{ad}}{L_{a1}}\right)^2\right]^{-1/2} + \left[1 - \left(\frac{X_{ad}}{L_{a1}}\right)^2\right]^{-1/2}\right] \quad \text{Eq. (10)}$$

The force on the node at the first input port, $F_{ap1}$, is shown in Eq.

$$F_{ap1} = K_{ad}X_{ad} + \left(\frac{1}{2} + \alpha_{aF}\right)X_{ac} \qquad \text{Eq. (11)}$$

The force on the node at the second input port, $F_{ap2}$, is shown in Eq. (12).

$$F_{ap2} = K_{ad}X_{ad} + \left(\frac{1}{2} - \alpha_{aF}\right)X_{ac} \qquad \text{Eq. (12)}$$

The force on the node at the output port, $F_{ap3}$, is shown in Eq. (13).

$$F_{ap3} = X_{ac} \qquad \text{Eq. (13)}$$

Propagation through the AND-gate system 10 requires the definition of several stiffness and energetics terms. The maximum possible differential stiffness, $k_{adMax}$, is defined by the total energy flow of the pulse into charging the differential mode accounting for the energy lost to dissipation during the traversal of the pulse between nodes, $e_{aDis}$, and the minimum value of the pulse energy at the inputs, $e_{aIn}$, as shown in Eq. (14).

$$k_{adMax} = \frac{e_{aIn} - e_{aDis}}{2x_{be}^2} \qquad \text{Eq. (14)}$$

The ratio of differential stiffness captures the extent to which the pulse energy is routed to the differential mode as shown in Eq. (15). FIG. 4 shows that high efficiency AND-gates can be found in the regime of $r_{kad}=0.15$, where only 15% of the pulse energy is drained to the differential mode.

$$r_{kad} = \frac{k_{ad}}{k_{adMax}} \qquad \text{Eq. (15)}$$

The pulse energy at the output 20b of the AND-gate system 10 is determined by $r_{aE}$, which may generally be set around 0.8-0.9 to ensure propagation despite fabrication variation. The theoretical maximum energy output of the AND-gate system 10, $e_{aOutMax}$, is calculated as shown in Eq. (16). The theoretical maximum energy output term considers energy dissipation and storage in the differential mode. This theoretical value provides an energetics-based constraint on the system, but as shown in FIG. 4, it is often not the limiting factor.

$$e_{aOut} = r_{aE}\overline{\left(e_{aIn} - e_{aDis} - 2k_{ad}x_{be}^2\right)}^{e_{aOutMax}} \qquad \text{Eq. (16)}$$

Kinematic modifications are necessary to ensure propagation, as the preceding analysis assumes all ports are at the bistable equilibrium locations. One parameter should be tuned to have the AND-gate system 10 over compensate with the output (output side 20b) so that an incomplete transition at the input still produces sufficient displacement at the output to drive pulse propagation. The term $l_{a1}$ is the preferred term for modification and is slightly reduced to amplify the gate response to input motions. The output port 20b must pass over a transition displacement, $x_{trans}$, to trigger pulse propagation. At the threshold $x_{trans}/x_{be} \approx 0.98$, all further nodes in the profile add less energy to the profile then the profile loses by advancing down the chain by a node, so propagation becomes energetically favorable. A static force balance can be written for the AND-gate system 10 to capture the unstable equilibrium of the AND-gate system when the output port 20b reaches the transition displacement, accounting for the input ports (input ends 12a and 12b) being connected to the tail end of a pulse profile rather than locked at equilibrium displacements, as shown in Eq. (17), where $f_{bxp1}$ ( . . . ), $f_{bxp2}$ ( . . . ) are functions calculating the bistable element forces applied on the nodes at the input 1 and 2 locations, respectively, $f_{ap1}$ ( . . . ), $f_{ap2}$ ( . . . ) and $f_{ap3}$ ( . . . ) are functions calculating the AND-gate forces applied on the nodes at the input 1, 2 and output, respectively, $k_{cp1}$ and $k_{cp1}$ are the coupling stiffnesses of the linkages to the input 1 and 2 port (input ends 12a and 12b, respectively), and the scaling terms on these coupling stiffnesses account for the extended chain of nodes behind the port nodes. The output port 20b node is assumed to have no forces on it from the chain since at transition the forces on the output port switch direction, passing through 0. The modified $l_{a1}$ term can be extracted from the system of equations, producing the value used in the AND-gate system 10 to ensure pulse propagation.

given $x_{p3} = x_{trans}$ $$k_{cp1} \cdot (-x_{be} - x_{p1}) \cdot \left(1 - \frac{k_{cp1}}{2k_{cp1} + k_{bxp1}(x_{be})}\right) + \qquad \text{Eq. (17)}$$

$$f_{bxp1}(x_{p1}) + f_{ap1}(x_{p1}, x_{p2}, x_{p3}, l_{a1trans}) = 0$$

$$k_{cp2} \cdot (x_{be} - x_{p2}) \cdot \left(1 - \frac{k_{cp2}}{2k_{cp2} + k_{bxp2}(x_{be})}\right) +$$

$$f_{bxp2}(x_{p2}) + f_{ap2}(x_{p1}, x_{p2}, x_{p3}, l_{a1trans}) = 0$$

$$f_{ap3}(x_{p1}, x_{p2}, x_{p3}, l_{a1trans}) = 0$$

find $x_{p1}, x_{p2}, x_{p3}, l_{a1trans} \rightarrow l_{a1trans}$

Figure 6:
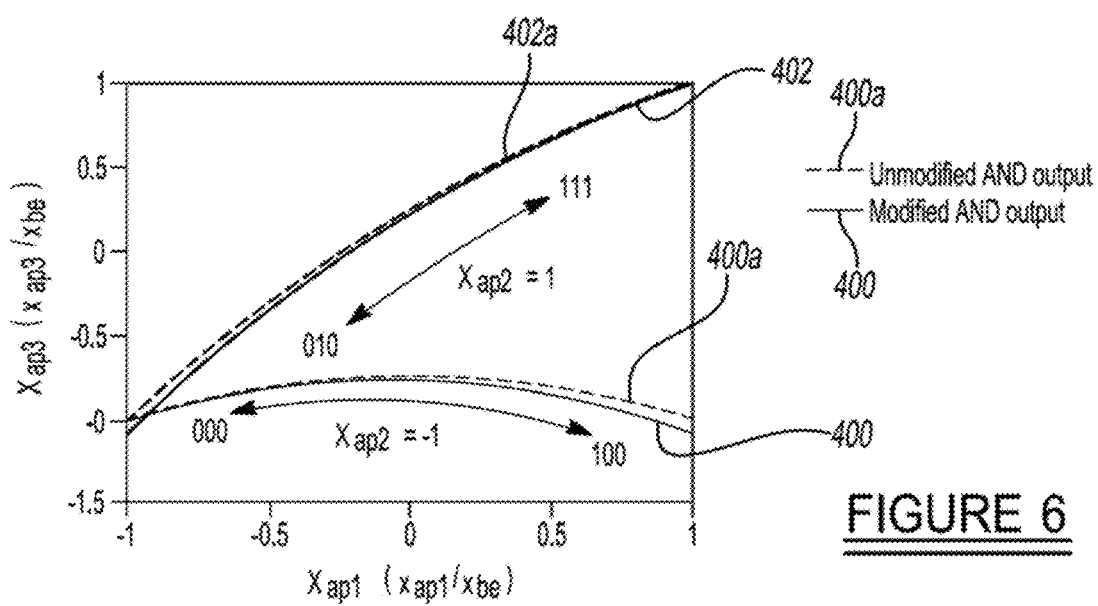
FIG. 6 shows graphs illustrating the geometric nonlinearity of the AND-gate system tested through two state transitions, measured at the output and driven by input 1, from 000 to 100, and from 010 to 111.

FIG. 6 shows the geometric nonlinearity of the AND-gate system 10 tested through two state transitions, measured at the output (i.e., the output side 20b of the compressive member 20), and driven by input 1,000 to 100, as represented by curve 400, and 010 to 111, as represented by curve 402. The dotted lines 400a and 402a show an unmodified AND-gate, while the solid lines (curves 400 and 402) show a propagation modified AND-gate. The state transition from 000→100 in the first case correctly avoids engaging the output port. The state transition from 010→111 in the second case correctly engages the output port. The ideal AND-gate behavior is compared to the propagation modified AND-gate behavior to show the scale of the output change.

The present disclosure thus provides a mechanical logic AND-gate system 10 that can carry out logical AND operations for displacement-based mechanical logic systems and applications. The AND-gate system 10 is scale-independent and can be readily combined with bistable micromechanical logic elements to carry out mechanical logical operations. The AND-gate system 10 design can be miniaturized, potentially down to the molecular scale, allowing computational power to be built into materials. Unpowered 3D printed structures may provide an alternate route to quantum bit coherence or perform logical operations by tapping into ambient energy and respond to specific keyed multi-dimensional environmental inputs. The potential of multi-domain sensors is to distribute intelligence down to the level of the sensor by enabling it to identify, discern, and intelligently differentiate signals, all without cumbersome power circuitry. Embedded mechanical logic incorporating the AND-gate system 10 is expected to be especially valuable in a wide variety of applications including, but not limited to, data storage in extreme environments, authentication tagging of high value items, and inexpensive disposable health or biochemical monitoring tabs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A mechanical AND-gate logic system, comprising:
   a first lever arm having first and second spaced apart input ends for independently receiving separate logic level 1 or logic level 0 input signals thereon;
   the first lever arm further including an output end spaced apart from the first and second input ends, the output end further being disposed generally equidistant from the first and second spaced apart ends;
   a second lever arm having an input end and an output end, and being able to move in both a pivotal movement and a translating movement;
   a first pivot linkage to couple the output end of the first lever arm to the input end of the second lever arm such that both the input end and the output end of the second lever arm are able to pivot and to translate;
   an output member translatable between first and second positions;
   the output end of the second lever arm being coupled to the output member via a second pivot linkage; and
   the second lever arm only being able to substantially translate and apply a logic 1 level input signal to the output member when a logic level 1 input signal is applied simultaneously to both of the first and second input ends of the first lever arm, and wherein translating movement of the second lever arm causes the output member to translate from the first position to the second position, representing changing from a logic 0 level state to a logic 1 level state.

2. The system of claim 1, wherein the first and second lever arms are longitudinally aligned along a straight line when logic 0 level input signals are applied to both of the first and second input ends of the first lever arm.

3. The system of claim 1, wherein the first and second lever arms extend along non-parallel longitudinal axes when a logic 1 level signal is applied to only one of the first and second input ends of the first lever arm.

4. The system of claim 1, wherein the first and second lever arms both pivot when a logic level 1 level signal is applied to only one of the first and second input ends of the first lever arm.

5. The system of claim 1, wherein the second lever arm only experiences translating movement when:

one of the first and second input ends of the first lever arm receives a logic 1 level signal while a logic 1 level signal is already being applied to the other one of the first and second input ends; and when a logic 1 level signal is removed from one of the first and second input ends of the first lever arm while the other one of the first and second input ends continues to receive a logic 1 level input signal.

6. The system of claim 1, wherein the first lever arm forms an inverted "V" shape, with the first and second input ends located at two ends of the inverted V shape.

7. The system of claim 1, wherein a differential stiffness of the system is set to absorb about 15% of a pulse energy applied by input signals representing logic level 1 signals on both of the first and second input ends of the first lever arm.

8. A mechanical AND-gate logic system, comprising:
a first lever arm having first and second spaced apart input ends for independently receiving separate logic level 1 or logic level 0 input signals thereon;
the first lever arm further including a output end spaced apart from the first and second input ends, the output end further being disposed generally equidistant from the first and second spaced apart ends;
a second lever arm forming a linear member having an input end and an output end, and being able to move in both a pivotal movement and a translating movement;
a first pivot linkage to couple the output end of the first lever arm to the input end of the second lever arm such that both the input end and the output end of the second lever arm are able to pivot and to translate;
a compressive stiffness member having an input end and an output end, and being translatable between first and second positions, and configured to apply a biasing force sufficient to prevent movement from the first position to the second position except when logic 1 level signals are being applied simultaneously to both of the first and second input ends of the first lever arm;
the output end of the second lever arm being coupled to the input end of the compressive stiffness member by a second pivot linkage;
the second lever arm only being able to translate and apply a logic 1 level input signal to the input end of the compressive stiffness member when a logic level 1 input signal is applied simultaneously to both of the first and second input ends of the first lever arm, and wherein translating movement of the second lever arm causes the compressive stiffness member to translate from the first position to the second position, representing changing from a logic 0 level state to a logic 1 level state; and
the biasing force generated by the compressive stiffness member being sufficient to cause translating and pivoting motion of both of the first and second lever arms when a logic 1 level input signal is removed from either of the first and second input ends of the first lever arm, to thus enable the compressive stiffness member to translate from a logic 1 level state back to a logic 0 level state.

9. The system of claim 8, wherein translating movement of the second lever arm sufficient to cause movement of the compressive stiffness member from the logic 0 level state to the logic 1 level state only occurs when simultaneously applying logic 1 level signals to the first and second input ends of the first lever arm.

10. The system of claim 8, wherein both input and output ends of the second lever arm pivot simultaneously, with no translating movement of the second lever arm, when a logic 1 level input signal is applied to only one of the first and second inputs of the first lever arm.

11. The system of claim 8, wherein a logic 1 level input signal applied to only one of the first and second ends of the first lever arm causes simultaneous pivoting movement of both of the first and second lever arms in opposite rotational directions.

12. The system of claim 11, wherein the second lever arm pivots when only one of the first and second ends of the first lever arm receives a logic 1 level input signal, but does not translate.

13. The system of claim 11, wherein the output end of the first lever arm, the input and output ends of the second lever arm and the input end of the compressive stiffness member are all required to be aligned along a common longitudinal axis for the compressive stiffness member to translate fully into the second position from the first position.

14. A method for forming a mechanical AND-gate logic system, the method comprising:
providing a first lever arm having first and second spaced apart input ends for independently receiving separate logic level 1 or logic level 0 input signals thereon;
configuring the first lever arm such that an output end thereof is spaced apart from the first and second input ends, the output end further being disposed generally equidistant from the first and second spaced apart ends;
using a first pivot linkage to couple the output end of the first lever arm to an input end of a second lever arm, and such that the second lever arm is able to move with both a pivotal movement at each of its input and output ends, and also a translating movement;
coupling an output member translatable between first and second positions to the output end of the second lever arm via a second pivot linkage; and
the second lever arm only being able to translate and apply a logic 1 level input signal to the output member when a logic level 1 input signal is applied simultaneously to both of the first and second input ends of the first lever arm, and wherein translating movement of the second lever arm causes the output member to translate from the first position to the second position, representing changing from a logic 0 level state to a logic 1 level state.

15. The method of claim 14, wherein the output member comprises a compressive stiffness member configured to operate to apply a predetermined biasing force to cause rotational motion of both of the first and second lever arms, and translating movement of the second lever arm, when a logic 1 level input signal being applied to one or the other of the first and second inputs of the first lever arm is removed while the other one of the first and second inputs is still receiving a logic 1 level input signal.

16. The method of claim 14, wherein an application of a logic 1 level input signal to only one of the first or second ends of the first lever arm causes a simultaneous rotational movement of both of the first and second lever arms.

17. The method of claim 16, where the simultaneous rotation of the first and second lever arms is in opposite rotational directions.

* * * * *